R. S. BASSETT.
WATER METER.
APPLICATION FILED AUG. 23, 1918.

1,307,337.

Patented June 24, 1919.

WITNESSES:
George B. Bassett
W J Chellew

INVENTOR
Robert S. Bassett

UNITED STATES PATENT OFFICE.

ROBERT S. BASSETT, OF BUFFALO, NEW YORK.

WATER-METER.

1,307,337.  Specification of Letters Patent.  Patented June 24, 1919.

Application filed August 23, 1918. Serial No. 251,171.

*To all whom it may concern:*

Be it known that I, ROBERT S. BASSETT, a citizen of the United States, residing at Buffalo, in the county of Erie and State of New York, have invented a new and useful Water-Meter, of which the following is a specification.

My invention relates to improvements in compound meters having a small operative device for measuring the ordinary or small flows and a large proportional device for measuring the extraordinary or large flows.

The objects of my present invention are principally to improve the construction and arrangement of parts in these meters for the purposes of reducing the cost of manufacture, increasing the durability and efficiency and giving other advantageous results.

I will now proceed to definitely describe the manner in which I have carried out my invention and then claim what I believe to be novel.

Figure 1:
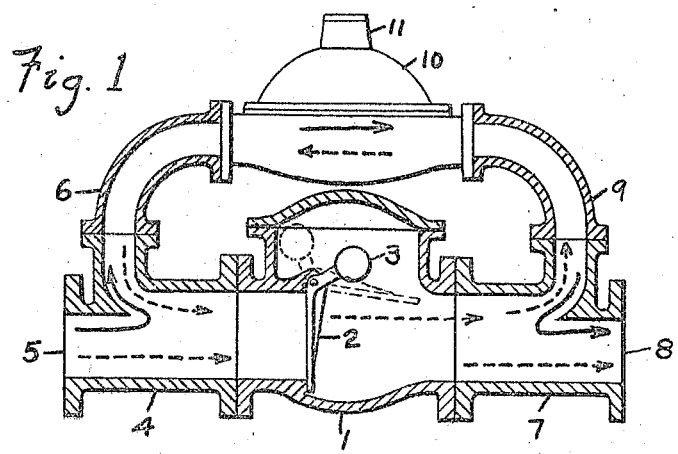
Figure 2:
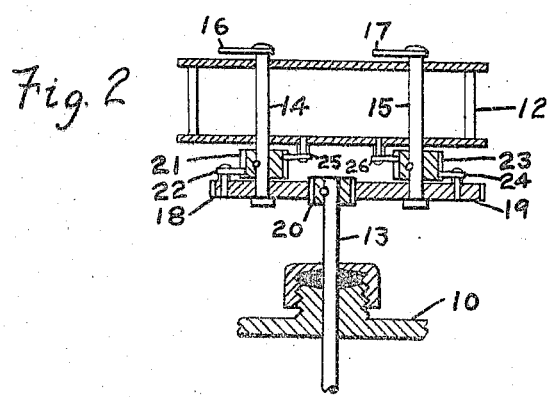
Figure 3:
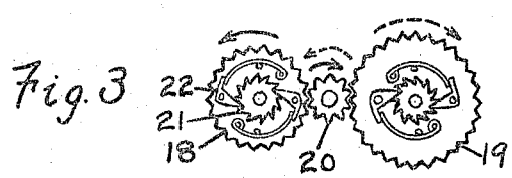

In the drawings, Figure 1 is a central vertical longitudinal section of my improved meter; Fig. 2 is a vertical section of the indicator and ratchet gears; Fig. 3 is a plan view of the ratchet gears looking downward.

Referring to the drawings, 1 is a valve casing in which is mounted automatic valve 2, which is held closed by counter weight 3 at all ordinary flows. At the inlet end of valve casing 1 is suction device 4 having main inlet 5 and by-pass pipe 6. At the outlet end of valve casing 1 is deflecting device 7 having main outlet 8 and by-pass pipe 9. Between by-pass pipe 6 and by-pass pipe 9 is located the measuring device 10, which is operated by the water when flowing through it in either direction, and which may be of the well known nutating disk type common in water meters.

On top of measuring device 10 is located register box 11 in which is located register 12, an enlarged section of which is shown in Fig. 2. 13 is the stuffing box shaft which rotates in one direction when water flows through measuring device 10 from by-pass pipe 6 to by-pass pipe 9, as shown by the solid arrows, and in the opposite direction when water flows through measuring device 10 from by-pass pipe 9 to by-pass pipe 6, as shown by the dotted arrows.

Register 12 has two register shafts 14 and 15 on the tops of which are mounted register hands 16 and 17 and on the bottoms of which are loosely mounted toothed gear wheels 18 and 19 which mesh with and are rotated in either direction by toothed gear wheel 20 rigidly mounted on stuffing box shaft 13. On register shaft 14 is rigidly mounted toothed ratchet wheel 21 which is rotated together with register shaft 14 by ratchet pawl 22 mounted on toothed wheel 18. On register shaft 15 is rigidly mounted toothed ratchet wheel 23 which is rotated together with register shaft 15 by ratchet pawl 24 mounted on toothed wheel 19. Ratchet pawl 25 mounted on the bottom of register 12 prevents register shaft 14 from turning except in one direction and ratchet pawl 26 also mounted on the bottom of register 12 prevents register shaft 15 from turning except in the opposite direction. This arrangement of toothed wheels and ratchets is such that when stuffing box shaft 13 rotates to the right register shaft 14 and its hand 16 will turn to the left and register shaft 15 and its hand 17 will remain stationary; but when stuffing box shaft 13 rotates to the left register shaft 15 and its hand 17 will then turn to the right and register shaft 14 and its hand 16 will remain stationary.

To illustrate the operation of my improved meter I will be concrete. A manufacturing plant may be ordinarily supplied with water through a 2 inch meter but in order to have a large flow of water for use in case of fire an 8 inch pipe is run into the plant from the public water supply. On this 8 inch pipe line is set my improved meter having an 8 inch water way through the valve casing 1 and a 2 inch disk measuring device 10 between the 2 inch by-passes 6 and 9. Ordinarily the flow of water will be in the direction shown by the solid arrows as the automatic valve 2 will remain closed and register hand 16 will turn registering the normal consumption of water. Should however an extraordinary amount of water be used as in case of fire the automatic valve 2 will be opened by the greater demand and take the position shown by the dotted lines and a portion of the water flowing through the valve will be deflected through by-pass 9, measuring device 10 and by-pass 6 in a reverse direction as shown by the dotted arrows and register hand 17 will turn registering the extraordinary flow through the meter.

One advantage of my improved meter is that measuring device 10 will be in operation one way or the other if any water at all is drawn through the meter and not likely to have its submerged working parts become corroded and stuck together by inaction.

Another advantage of my improved meter is that no mechanical connection is necessary between the valve and the measuring device or register.

Another advantage of my improved meter is that the mechanical parts which distinguish between the ordinary and extraordinary flows are none of them submerged and therefore not so liable to corrode and stick.

I do not hereby confine myself to the exact forms of valve, suction device, deflecting device, measuring device, or ratchet device shown herein as many variations of these may be made without departing from the spirit of my invention.

Having thus described my invention, what I claim and wish to secure by Letters Patent, is—

1. A water meter comprising a measuring device operative by a flow through it in either direction, a valve and a suction device located on the inlet side of said valve between said measuring device and said valve; substantially as and for the purpose described.

2. A water meter comprising a measuring device operative by a flow through it in either direction, a valve and a deflecting device located on the outlet side of said valve between said measuring device and said valve; substantially as and for the purpose described.

3. A water meter comprising a measuring device operative by a flow through it in either direction, a valve, a suction device located on the inlet side of said valve between said measuring device and said valve and a deflecting device located on the outlet side of said valve between said measuring device and said valve; substantially as and for the purpose described.

4. A water meter comprising a measuring device operative by a flow alternately through it in either direction and two registering devices adapted to alternately register and separately indicate the same; substantially as and for the purpose described.

5. A water meter comprising a single measuring device operative by a flow alternately through it in either direction and two registering devices adapted to separately register and separately indicate the flow in each direction; substantially as and for the purpose described.

6. A water meter comprising a valve, a by-pass around said valve, and a measuring device in said by-pass adapted to measure and separately indicate the flow alternately through said by-pass in one direction when said valve is closed and in the reverse direction when said valve is open; substantially as and for the purpose described.

7. A water meter comprising a valve, a by-pass around said valve, and a measuring device in said by-pass adapted to measure alternately all the water passing through said meter when said valve is closed and a flow proportional to the water passing through said meter when said valve is open; substantially as and for the purpose described.

8. A water meter comprising a valve, a by-pass around said valve, a measuring device in said by-pass adapted to measure the flow through said by-pass when said valve is either closed or open, two registering devices operated by said measuring device, one registering the flows through the measuring device when said valve is closed and the other when said valve is open, without mechanical connection between said valve and said registering or measuring device; substantially as and for the purpose described.

9. A water meter comprising a valve, a by-pass around said valve, a single measuring device in said by-pass, and two registering devices, operated by said measuring device, one registering the flows through the meter when said valve is closed and the other when said valve is open; substantially as and for the purpose described.

10. A water meter comprising a valve, a by-pass around said valve, means for passing all the flow through said by-pass in one direction when said valve is closed and a flow, proportional to the flow through said valve, through said by-pass in the reverse direction when said valve is open, and means for measuring and separately indicating both said flows through said by-pass; substantially as and for the purpose described.

ROBERT S. BASSETT.

Witnesses:
W. J. CHELLEW,
GEORGE B. BASSETT.

Copies of this patent may be obtained for five cents each, by addressing the "Commissioner of Patents, Washington, D. C."